United States Patent
Choi et al.

(10) Patent No.: US 12,358,129 B2
(45) Date of Patent: Jul. 15, 2025

(54) TRANSPORT APPARATUS AND CONTROL METHOD THEREOF

(71) Applicant: SEMES CO., LTD., Cheonan-si (KR)

(72) Inventors: Jong Suk Choi, Busan (KR); Ju Hee Shin, Gunpo-si (KR); Min Jae Park, Ulsan (KR); Na Hyun Kim, Suwon-si (KR)

(73) Assignee: SEMES CO., LTD., Cheonan-si (KR)

( * ) Notice: Subject to any disclaimer, the term of this patent is extended or adjusted under 35 U.S.C. 154(b) by 276 days.

(21) Appl. No.: 17/506,104

(22) Filed: Oct. 20, 2021

(65) Prior Publication Data

US 2022/0134548 A1    May 5, 2022

(30) Foreign Application Priority Data

Oct. 29, 2020   (KR) .................. 10-2020-0141994

(51) Int. Cl.
*B25J 9/16*          (2006.01)
*G06K 19/077*     (2006.01)

(52) U.S. Cl.
CPC ........... *B25J 9/1612* (2013.01); *B25J 9/1674* (2013.01); *B25J 9/1694* (2013.01); *G06K 19/07758* (2013.01)

(58) Field of Classification Search
CPC ...... B25J 9/1612; B25J 9/1674; B25J 9/1694; B25J 9/1679; B25J 5/007; B25J 5/02; B25J 9/1602; B25J 9/161; B25J 9/162; B25J 9/1628; B25J 9/163; B25J 9/1653; B25J 9/1656; B25J 9/1661; B25J 9/1664; B25J 11/0095; B25J 13/087; G06K 19/07758; G06K 17/00; Y02P 90/02; B65G 49/07;
(Continued)

(56) References Cited

U.S. PATENT DOCUMENTS

2015/0378356 A1* 12/2015 Hefeeda ............. G05B 19/4185
                                                                    700/9
2016/0154693 A1*  6/2016 Uhde .................. G06F 11/0751
                                                                    714/49

(Continued)

FOREIGN PATENT DOCUMENTS

CN     107572269     1/2018
CN     108319258     7/2018

(Continued)

OTHER PUBLICATIONS

Office Action dated Nov. 17, 2022 for Korean application No. 10-2020-0141994.

(Continued)

*Primary Examiner* — Abby Y Lin
*Assistant Examiner* — Esvinder Singh
(74) *Attorney, Agent, or Firm* — KILE PARK REED & HOUTTEMAN PLLC

(57) ABSTRACT

A transport apparatus includes a transport module for transporting a material, a first control module in which a control program for controlling operations of the transport module is installed, and a second control module in which the control program is installed. The second control module monitors operations of the first control module and executes the control program to control the operations of the transport module when a failure occurs in the first control module.

7 Claims, 3 Drawing Sheets

(58) Field of Classification Search
CPC .............. B65G 43/00; H01L 21/6773; H01L 21/67253; H01L 21/67259; H01L 21/67706; H01L 21/67715; H01L 21/67769; H01L 21/67242; H01L 21/67276; G05B 19/0425; G05B 19/048; G05B 19/058; G05B 19/406; G05B 19/4063; G05B 23/0205; G05B 23/0208; G05B 23/0286; G05B 23/0297; G05B 2219/14006; G05B 2219/14056; G05B 2219/23463; G05B 2219/24021; G05B 2219/24044; G05B 2219/24058; G05B 2219/24189; G05B 2219/33315; G05B 2219/50185; G05B 2219/2234; G05B 2219/2239; G05B 2219/23032; G05B 2219/14036

See application file for complete search history.

(56) References Cited

U.S. PATENT DOCUMENTS

2017/0116097 A1* 4/2017 Keremane .......... G06F 11/2092
2021/0178576 A1* 6/2021 Murphy ................ B25J 9/1697
2022/0039889 A1* 2/2022 Desai ..................... B25J 9/1602
2022/0088800 A1* 3/2022 Patil .................... B25J 15/0014
2022/0138930 A1* 5/2022 Mori .................. G01N 21/9501
                                                        382/149
2023/0236551 A1* 7/2023 Janssen ............... G05B 19/058
                                                         700/79

FOREIGN PATENT DOCUMENTS

| KR | 10-2005-0114138 | 12/2005 |
| KR | 10-1017407 | 2/2011 |
| KR | 10-2019-0083152 | 7/2019 |
| KR | 10-2005945 | 10/2019 |
| KR | 10-2019-0139059 | 12/2019 |

OTHER PUBLICATIONS

Chinese Office Action, with English Translation, for Chinese Patent Application No. 202111220597.7, dated Dec. 27, 2023.

* cited by examiner

TRANSPORT APPARATUS AND CONTROL METHOD THEREOF

CROSS-REFERENCE TO RELATED APPLICATION

This application claims the priority benefit of Korean Patent Application No. 10-2020-0141994, filed on Oct. 29, 2020, and all the benefits accruing therefrom under 35 U.S.C. § 119, the contents of which are incorporated by reference in their entirety.

TECHNICAL FIELD

The present disclosure relates to a transport apparatus and a control method thereof. More specifically, the present disclosure relates to a transport apparatus for transporting materials in a semiconductor device manufacturing process, and a method of controlling the same.

BACKGROUND

In a manufacturing process of semiconductor devices, materials such as semiconductor wafers, printed circuit boards, etc. may be transported by a transport apparatus such as an Overhead Hoist Transport (OHT), a Rail Guided Vehicle (RGV), an Automatic Guided Vehicle (AGV), a tower lift, etc., and may be stored in a stocker apparatus including a plurality of shelves for storing the materials and a transfer robot for transferring the materials.

The transport of the materials may be controlled by an upper control module such as a Material Control System (MCS). The transport apparatus may include a transport module for transporting the materials and a control module for controlling operations of the transport module, and a control program for controlling the operations of the transport module may be installed in the control module. The control module may receive a transport command from the upper control module, and may execute the control program to control the operations of the transport module based on the transport command.

When a failure occurs in the control module while transporting the materials using the transport apparatus, for example, when a network failure, a power supply failure, etc. occurs, the operation of the transport module may be stopped, thereby the time required for material transport may be increased.

SUMMARY

Embodiments of the present invention provide a transport apparatus capable of overcoming failures of a control module and a control method thereof.

In accordance with an aspect of the present invention, a transport apparatus may include a transport module configured to transport a material, a first control module in which a control program for controlling operations of the transport module is installed, and a second control module in which the control program is installed. In such case, the second control module may monitor operations of the first control module and may execute the control program to control the operations of the transport module when a failure occurs in the first control module.

In accordance with some embodiments of the present invention, the first control module may receive information of the material and a transport command for the material from an upper control module.

In accordance with some embodiments of the present invention, the first control module may generate event log files related to the operations of the transport module while transporting the material, and may include a first memory unit for storing the information of the material, the transport command for the material and the event log files.

In accordance with some embodiments of the present invention, the second control module may include a second memory unit, and may copy and store the information of the material, the transport command for the material and the event log files stored in the first memory unit in the second memory unit.

In accordance with some embodiments of the present invention, the second control module may determine whether the failure occurs in the first control module based on the event log files generated by the first control module.

In accordance with some embodiments of the present invention, the transport module may include a transport robot comprising a robot hand for handling the material, a drive unit for moving the transport robot, and a sensor mounted on the robot hand and configured to detect the material.

In accordance with some embodiments of the present invention, the second control module may check whether there is a material being transported by the transport module using the sensor when the control program is executed.

In accordance with some embodiments of the present invention, an electronic tag storing information of the material may be attached to the material, and the transport robot may include a reader for recognizing the information of the material from the electronic tag.

In accordance with some embodiments of the present invention, the first control module may receive information of the material and a transport command for the material from an upper control module, and the second control module may copy and store the information of the material and the transport command for the material from the first control module, and may compare the information of the material copied from the first control module with the information of the material recognized by the reader.

In accordance with some embodiments of the present invention, the second control module may control the operations of the transport module to resume transport of the material when the information of the material copied from the first control module is the same as the information of the material recognized by the reader.

In accordance with some embodiments of the present invention, the transport module may further include a control unit for controlling operations of the transport robot and the drive unit according to operation commands provided from the first control module or the second control module.

In accordance with some embodiments of the present invention, the second control module may check whether the control program is executed by a failover function.

In accordance with another aspect of the present invention, in a control method of a transport apparatus comprising a transport module configured to transport a material, a first control module in which a control program for controlling operations of the transport module is installed, and a second control module in which the control program is installed, the control method may include controlling the operations of the transport module using the first control module to transport the material, monitoring operations of the first control module using the second control module, and executing the control program installed in the second control module when a failure occurs in the first control module.

In accordance with some embodiments of the present invention, the first control module may receive information of the material and a transport command for the material from an upper control module.

In accordance with some embodiments of the present invention, the first control module may generate event log files related to the operations of the transport module while transporting the material, and the second control module may copy and store the information of the material, the transport command for the material and the event log files from the first control module.

In accordance with some embodiments of the present invention, the second control module may determine whether the failure occurs in the first control module based on the event log files.

In accordance with some embodiments of the present invention, an electronic tag storing information of the material may be attached to the material, and the transport module may include a transport robot comprising a robot hand for handling the material, a drive unit for moving the transport robot, and a reader for recognizing the information of the material from the electronic tag.

In accordance with some embodiments of the present invention, the control method may further include recognizing the information of the material using the reader after the control program installed in the second control module is executed, comparing the information of the material copied from the first control module with the information of the material recognized by the reader, and controlling the operations of the transport module to resume transport of the material using the second control module when the information of the material copied from the first control module is a same as the information of the material recognized by the reader.

In accordance with some embodiments of the present invention, the control method may further include checking whether the control program is executed by a failover function after the control program installed in the second control module is executed.

In accordance with still another aspect of the present invention, in a control method of a transport apparatus comprising a transport module configured to transport a material, a first control module in which a control program for controlling operations of the transport module is installed, and a second control module in which the control program is installed, the control method may include receiving information of the material and a transport command for the material from an upper control module using the first control module, controlling the operations of the transport module using the first control module to transport the material, monitoring operations of the first control module using the second control module, executing the control program installed in the second control module when a failure occurs in the first control module, checking whether the control program installed in the second control module is executed by a failover function, checking whether the material being transported by the transport module complies with the transport command when the control program installed in the second control module is executed by the failover function, and controlling the operations of the transport module by using the second control module to resume transport of the material when the material complies with the transport command.

In accordance with the embodiments of the present invention as described above, when a failure occurs in the first control module while transporting the material using the transport module, the control program installed in the second control module may be executed. The second control module may check whether the material being transported by the transport module complies with the transport command, and may then resume the transport of the material. Accordingly, even when failures occur in the first control module, the failures may be easily overcome by the second control module. As a result, the interruption of the transport of the material may be prevented, and the time required for the transport of the material may be shortened.

The above summary of the invention is not intended to describe each illustrated embodiment or every implementation of the present invention. The detailed description and claims that follow more particularly exemplify these embodiments.

BRIEF DESCRIPTION OF THE DRAWINGS

Embodiments of the present invention can be understood in more detail from the following description taken in conjunction with the accompanying drawings, in which.

Figure 1:
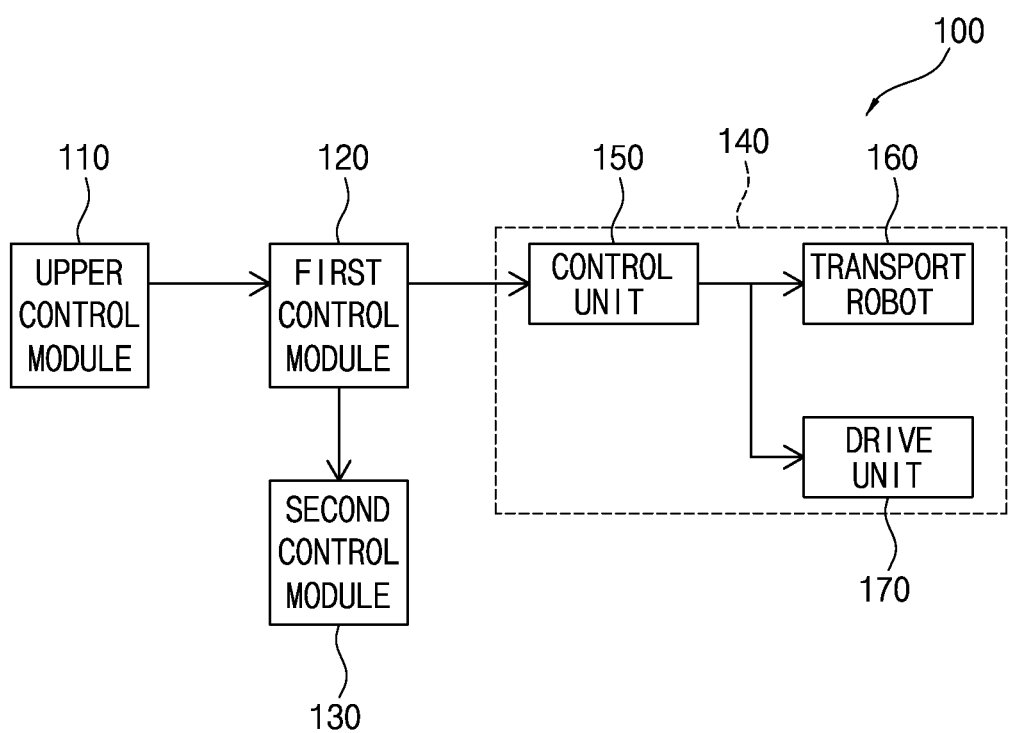
FIG. 1 is a block diagram illustrating a transport apparatus in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

Figure 2:
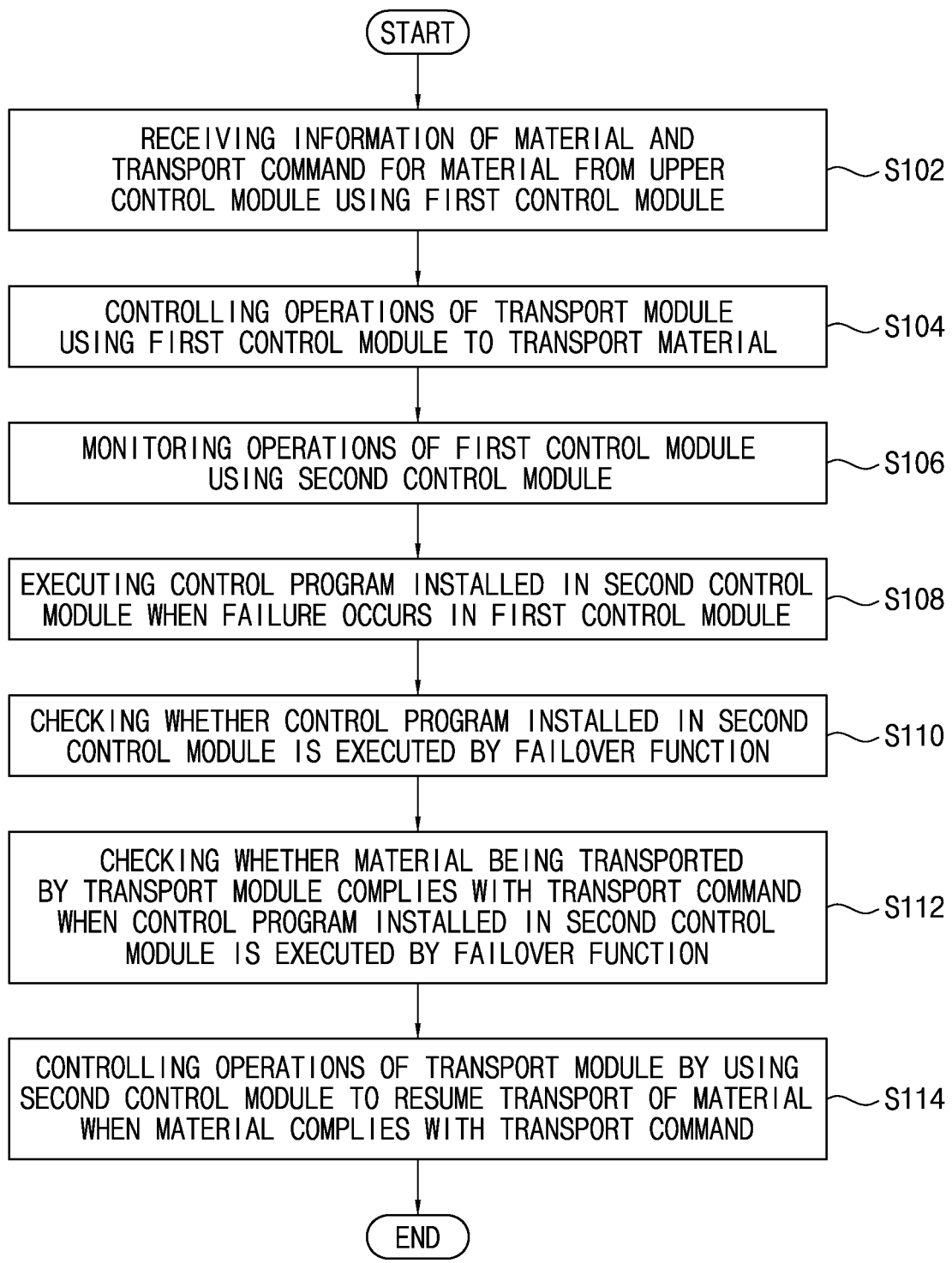
FIG. 2 is a flowchart illustrating a control method of the transport apparatus as shown in FIG. 1.

FIG. 1 is a block diagram illustrating a transport apparatus in accordance with an embodiment of the present invention, and FIG. 2 is a flowchart illustrating a control method of the transport apparatus as shown in FIG. 1.

Referring to FIGS. 1 and 2, a transport apparatus 100 and a control method thereof, in accordance with an embodiment of the present invention, may be used to transport a material 10 (refer to FIG. 3) in a semiconductor device manufacturing process. For example, the transport apparatus 100 may be used to transport a container such as a Front Opening Unified Pod (FOUP) and a Front Opening Shipping Box (FOSB) in which semiconductor wafers are accommodated. As another example, the transport apparatus 100 may be used to transport a container in which a photoresist composition is accommodated. Further, for example, the transport apparatus 100 may be a tower lift for transporting the material 10 in a vertical direction. As another example, the transport apparatus 100 may be a crane used for transporting the material 10 in a stocker apparatus including a plurality of shelves.

In accordance with an embodiment of the present invention, the transport apparatus 100 may include a transport module 140 for transporting the material 10, a first control module 120 in which a control program for controlling operations of the transport module 140 is installed, and a second control module 130 in which the control program in installed. The control program may provide operation commands to control the operations of the transport module 140, and the transport module 140 may transport the material 10 according to the operation commands.

Figure 3:
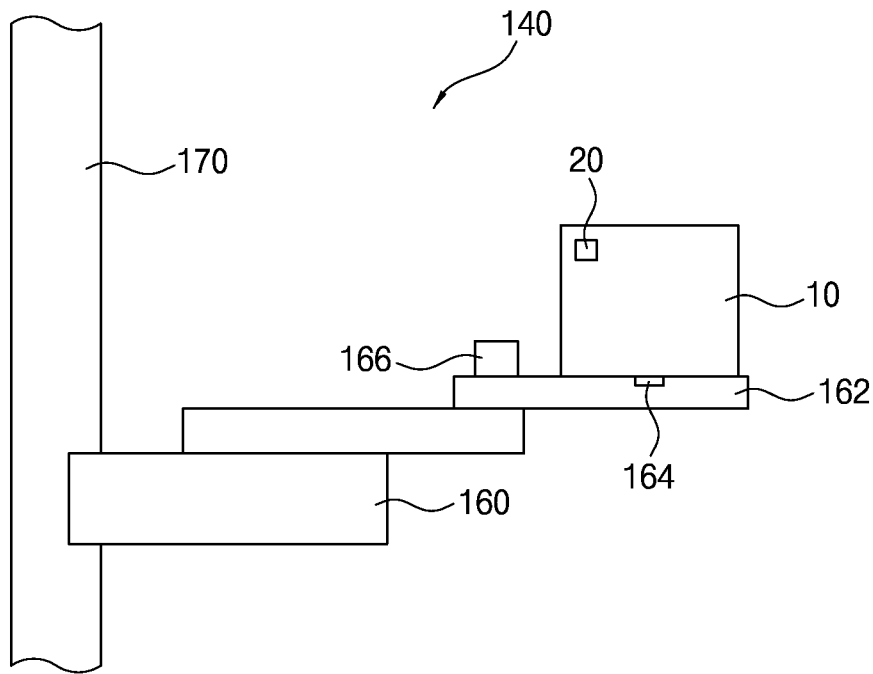
FIG. 3 is a schematic view illustrating a transport module as shown in FIG. 1.

FIG. 3 is a schematic view illustrating the transport module as shown in FIG. 1.

Referring to FIG. 3, the transport module 140 may include a transport robot 160 for transporting the material 10 and a drive unit 170 for moving the transport robot 160 in vertical and horizontal directions. The transport robot 160 may include a robot hand 162 for handling the material 10. For example, the robot hand 162 may support the material 10, and alignment pins (not shown) for aligning the material 10 may be disposed on the robot hand 162. Further, a sensor 164 for detecting the material 10 may be mounted on the robot hand 162, and the first control module 120 may check whether the material 10 is present on the robot hand 162 using the sensor 164.

In accordance with an embodiment of the present invention, the first control module 120 may be used as a master module for controlling the operations of the transport module 140, and the second control module 130 may be used as a slave module. In particular, the second control module 130 may be used to overcome failures of the first control module 120. For example, a failover program may be installed in the second control module 130, and the second control module 130 may monitor operations of the first control module 120 using the failover program.

For example, when a failure such as a network failure or a power supply failure occurs in the first control module 120, and thereby the operation of the first control module 120 is stopped, the second control module 130 may execute the control program installed in the second control module 130 to control the operation of the transport module 140. As another example, when the second control module 130 is used as a master module for controlling the operations of the transport module 140 and the first control module 120 is used as a slave module, a failover program for monitoring operations of the second control module 130 and executing the control program when a failure occurs in the second control module 130 may be installed in the first control module 120.

In accordance with an embodiment of the present invention, the transport apparatus 100 may include an upper control module 110 for providing a transport command for the material 10. For example, the transport apparatus 100 may include an upper control module 110 such as a Material Control System (MCS), and the upper control module 110 may provide information on the material 10 to be transported and a transport command for the material 10 to the first control module 120. The first control module 120 may provide operation commands to the transport module 140 based on the transport command. For example, when moving the material 10 placed on a load port of the stocker apparatus onto one of the shelves, the first control module 120 may sequentially provide a first command for moving the transport robot 160 to a position adjacent to the load port, a second command for picking up the material 10 from the load port, a third command for moving the transport robot 160 to a position adjacent to the one of the shelves, and a fourth command for placing the material 10 onto the one of the shelves to the transport module 140.

The transport module 140 may transport the material 10 according to the operation commands provided from the first control module 120. The transport module 140 may include a control unit 150 for controlling operations of the transport robot 160 and the drive unit 170 according to the operation commands. For example, the transport robot 160 and the drive unit 170 may include driving motors for providing a driving force. The control unit 150 may include motion controllers for controlling operations of the driving motors and servo drives for providing a driving current to the driving motors, and may be connected to the first and second control modules 120 and 130 through wireless communication.

In accordance with an embodiment of the present invention, the first control module 120 may generate event log files related to the operations of the transport module 140 while transporting the material 10. Further, the first control module 120 may include a first memory unit (not shown) for storing the information of the material 10 received from the upper control module 110, the transport command for the material 10, and the event log files.

The second control module 130 may include a second memory unit (not shown), and may copy and store the information of the material 10, the transport command for the material 10 and the event log files stored in the first memory unit in the second memory unit. In particular, the second control module 130 may determine whether a failure has occurred in the first control module 120 based on the event log files generated by the first control module 120. For example, when a new event log file is not generated for a predetermined time, the second control module 130 may determine that a failure has occurred in the first control module 120.

When it is determined that a failure has occurred in the first control module 120, the second control module 130 may execute the control program, and may be connected to the transport module 140. When a failure occurs in the first control module 120, the operation of the transport module 140 may be stopped. For example, when a failure occurs in the first control module 120 while the transport module 140 performs one of the operation commands, the operation of the transport module 140 may be stopped after performing the one of the operation commands.

After the control program installed in the second control module 130 is executed, the second control module 130 may check whether there is a material 10 being transported by the transport module 140. For example, the second control module 130 may check whether the material 10 is present on the robot hand 162 using the sensor 164.

Further, the second control module 130 may check whether the control program is executed by a failover function so as to prevent the control program of the second control module 130 from being double executed even though no failure has occurred in the first control module 120, that is, even though the first control module 120 is operating normally. For example, when the control program of the second control module 130 is executed by an operator's mistake, the second control module 130 may check whether the control program is executed by the failover function, and if not by the failover function, may terminate the control program forcibly.

For example, the second control module 130 may determine whether the execution of the control program is due to the failover function by checking the event log files of the first control module 120. As another example, the failover program installed in the second control module 130 may generate a failover event log file when the control program is executed to overcome the failure of the first control module 120, and the second control module 130 may determine from the failover event log file whether the execution of the control program is due to the failover function.

Referring again to FIG. 3, an electronic tag 20 in which information of the material 10 is stored may be attached to the material 10, and the transport robot 160 may include a reader 166 for recognizing the information of the material 10 from the electronic tag 20. For example, an electronic tag 20 such as a Radio-Frequency Identification (RFID) tag or a bar code may be attached to the material 10, and the transport robot 160 may include an RFID reader or a barcode reader.

The second control module 130 may compare the information of the material 10 copied from the first control module 120 with the information of the material 10 recognized by the reader 166, and may control the operations of the transport module 140 to resume the transport of the material 10 when the information of the material 10 copied from the first control module 120 is the same as the information of the material recognized by the reader 166.

Figure 4:
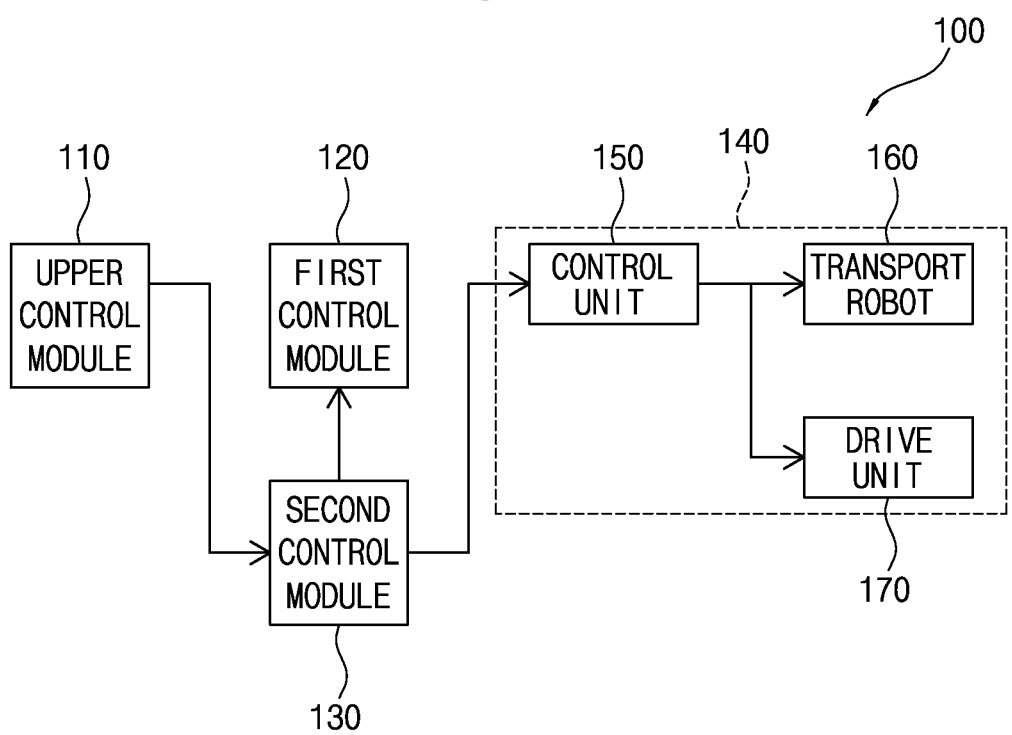
FIG. 4 is a block diagram illustrating the operations of a second control module and the transport module as shown in FIG. 1.

FIG. 4 is a block diagram illustrating the operations of the second control module and the transport module as shown in FIG. 1.

Referring to FIG. 4, when the operation of the first control module 120 is stopped due to the failure, the second control module 130 may be used as a master module. Further, when the operation of the transport module 140 is controlled by the second control module 130, the second control module 130 may receive information of a subsequent material and a transport command for the subsequent material from the upper control module 110 after the transport of the material 10 is completed.

Meanwhile, the first control module 120 may be rebooted or resolved by an operator, and may then be used as a slave module. Particularly, after the failure is resolved, the first control module 120 may monitor operations of the second control module 130, and when a failure occurs in the second control module 130, the first control module 120 may overcome the failure of the second control module 130 by using a failover function.

Hereinafter, a method of controlling the transport apparatus 100 according to an embodiment of the present invention will be described with reference to the accompanying drawings.

Referring to FIG. 2, in step S102, the first control module 120 may receive a transport command for transporting the material 10 from the upper control module 110. Specifically, the first control module 120 may receive information of the material 10 and a transport command for the material 10 from the upper control module 110. In step S104, the transport module 140 may transport the material 10 according to the transport command. Specifically, the first control module 120 may control the operations of the transport module 140 to transport the material 10.

In step S106, the second control module 130 may monitor operations of the first control module 120. In step S108, when a failure occurs in the first control module 120, the control program installed in the second control module 130 may be executed. Specifically, the second control module 130 may copy and store event log files related to the operations of the transport module 140 from the first control module 120, and may determine whether a failure has occurred in the first control module 120 based on the event log files. In addition, the second control module 130 may copy and store the information of the material 10 and the transport command for the material 10 stored in the first control module 120.

In step S110, the second control module 130 may determine whether the execution of the control program is performed by the failover function. For example, the second control module 130 may analyze the event log files to determine whether the execution of the control program is due to the failover function. Further, although not shown, the second control module 130 may check whether a material 10 being transported by the transport module 140 is present on the robot hand 162 using the sensor 162.

In step S112, when the execution of the control program is performed by the failover function, the second control module 130 may check whether the material 10 being transported by the transport module 140 complies with the transport command. Specifically, the second control module 130 may check the information of the material 10 being transported by the transport module 140 using the reader 166 and compare it with the information of the material 10 copied from the first control module 120. In step S114, when the material 10 complies with the transport command, the second control module 130 may control the operation of the transport module 140 to resume transport of the material 10.

In accordance with the embodiments of the present invention as described above, when a failure occurs in the first control module 120 while transporting the material 10 using the transport module 140, the control program installed in the second control module 130 may be executed. The second control module 130 may check whether the material 10 being transported by the transport module 140 complies with the transport command, and may then resume the transport of the material 10. Accordingly, even when failures occur in the first control module 120, the failures may be easily overcome by the second control module 130. As a result, the interruption of the transport of the material 10 may be prevented, and the time required for the transport of the material 10 may be shortened.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. A transport apparatus comprising:
a transporter configured to transport a material;
a first controller in which a control program for controlling operations of the transporter is installed; and
a second controller in which the control program is installed,
wherein the second controller monitors operations of the first controller and, when a failure occurs in the first controller, executes the control program to overcome the failure of the first controller and to control the operations of the transporter,
wherein the second controller checks whether the control program is executed by a failover function,
wherein the failover function generates a failover event log file when the control program is executed, and the second controller determines from the failover event log file whether the execution of the control program is due to the failover function, and forcibly terminates the executed control program when the execution of the control program is not due to the failover function, and
wherein the transporter comprises:
a transport robot comprising a robot hand for handling the material;
a driver for moving the transport robot; and
a sensor mounted on the robot hand and configured to detect the material, and
wherein the second controller is configured to check whether the material being transported is present on the robot hand using the sensor,
the first controller generates event log files related to the operations of the transporter while transporting the material,
the second controller copies and stores the event log files from the first controller, and
the second controller determines that the failure occurs in the first controller when a new event log files is not generated for a predetermined time by the first controller,
wherein the second controller checks whether there is a material being transported by the transporter using the sensor when the control program is executed,
an electronic tag storing information of the material is attached to the material,
the transport robot comprises a reader for recognizing the information of the material from the electronic tag,
the first controller receives information of the material and a transport command for the material from an upper controller,
the second controller copies and stores the information of the material and the transport command for the material from the first controller, and compares the information of the material copied from the first controller with the information of the material recognized by the reader, and
the second controller controls the operations of the transporter to resume transport of the material when the information of the material copied from the first controller is a same as the information of the material recognized by the reader.

2. The transport apparatus of claim 1, wherein the first controller receives information of the material and a transport command for the material from an upper controller.

3. The transport apparatus of claim 2, wherein the first controller comprises a first memory unit for storing the information of the material, the transport command for the material and the event log files.

4. The transport apparatus of claim 3, wherein the second controller comprises a second memory unit, and copies and stores the information of the material, the transport command for the material and the event log files stored in the first memory unit in the second memory unit.

5. The transport apparatus of claim 1, wherein the transporter further comprises a third controller for controlling operations of the transport robot and the driver according to operation commands provided from the first controller or the second controller.

6. A control method of a transport apparatus comprising a transporter configured to transport a material, a first controller in which a control program for controlling operations of the transporter is installed, and a second controller in which the control program is installed, the control method comprising:
controlling the operations of the transporter using the first controller to transport the material;
monitoring operations of the first controller using the second controller;
executing the control program installed in the second controller when a failure occurs in the first controller;
checking whether the control program is executed by a failover function after the control program installed in the second controller is executed; and
forcibly terminates the executed control program when the execution of the control program installed in the second controller is not due to the failover function,
wherein the failover function generates a failover event log file when the control program is executed, and the second controller determines from the failover event log file whether the execution of the control program is due to the failover function, and,
wherein an electronic tag storing information of the material is attached to the material, and
the transporter comprises a transport robot comprising a robot hand for handling the material, a driver for moving the transport robot, a sensor mounted on the robot hand and configured to detect the material and a reader for recognizing the information of the material from the electronic tag, and
wherein the second controller is configured to check whether the material being transported is present on the robot hand using the sensor,
the first controller generates event log files related to the operations of the transporter while transporting the material,
the second controller copies and stores the event log files from the first controller, and
the second controller determines that the failure occurs in the first controller when a new event log files is not generated for a predetermined time by the first controller,
wherein the reader recognizes the information of the material from the electronic tag after the control program installed in the second controller is executed, the information of the material copied from the first controller is compared with the information of the material recognized by the reader, and the operations of the transporter are controlled to resume transport of the material using the second controller when the information of the material copied from the first controller is the same as the information of the material recognized by the reader.

7. A control method of a transport apparatus comprising a transporter configured to transport a material, a first controller in which a control program for controlling operations of the transporter is installed, and a second controller in which the control program is installed, the control method comprising:

receiving information of the material and a transport command for the material from an upper controller using the first controller;

controlling the operations of the transporter using the first controller to transport the material;

monitoring operations of the first controller using the second controller;

executing the control program installed in the second controller when a failure occurs in the first controller;

checking whether the control program installed in the second controller is executed by a failover function;

checking whether the material being transported by the transporter complies with the transport command when the control program installed in the second controller is executed by the failover function;

controlling the operations of the transporter by using the second controller to resume transport of the material when the material complies with the transport command; and forcibly terminates the executed control program when the execution of the control program installed in the second controller is not due to the failover function, wherein the failover function generates a failover event log file when the control program is executed, and the second controller determines from the failover event log file whether the execution of the control program is due to the failover function, and wherein the transporter comprises:

a transport robot comprising a robot hand for handling the material;

a driver for moving the transport robot; and a sensor mounted on the robot hand and configured to detect the material, and wherein the second controller is configured to check whether the material being transported is present on the robot hand using the sensor, the first controller generates event log files related to the operations of the transporter while transporting the material, the second controller copies and stores the event log files from the first controller, and the second controller determines that the failure occurs in the first controller when a new event log files is not generated for a predetermined time by the first controller, wherein an electronic tag storing information of the material is attached to the material, the transport robot comprises a reader for recognizing the information of the material from the electronic tag, the reader recognizes the information of the material from the electronic tag after the control program installed in the second controller is executed, the information of the material copied from the first controller is compared with the information of the material recognized by the reader, and the operations of the transporter are controlled to resume transport of the material using the second controller when the information of the material copied from the first controller is the same as the information of the material recognized by the reader.

* * * * *